United States Patent
Boss et al.

(10) Patent No.: US 7,889,087 B2
(45) Date of Patent: Feb. 15, 2011

(54) IMMERSION DETECTION

(75) Inventors: Gregory J. Boss, American Fork, UT (US); Peter G. Finn, Brampton, CA (US); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/245,816

(22) Filed: Oct. 6, 2008

(65) Prior Publication Data

US 2010/0085198 A1    Apr. 8, 2010

(51) Int. Cl.
*G08B 21/00* (2006.01)
(52) U.S. Cl. .................. 340/626; 340/603; 340/604; 340/611; 340/612; 340/614
(58) Field of Classification Search .............. 340/451, 340/438, 425.5, 603, 604, 605, 611–612, 340/614, 626
See application file for complete search history.

(56) References Cited

U.S. PATENT DOCUMENTS

| | | | | |
|---|---|---|---|---|
| 3,824,460 A * | 7/1974 | Gustafson | ................... | 324/664 |
| 3,930,221 A * | 12/1975 | Thing | ........................ | 340/451 |
| 4,097,852 A * | 6/1978 | Usry | ........................ | 340/626 |
| 5,371,720 A * | 12/1994 | Cuomo | ........................ | 367/149 |
| 5,517,181 A * | 5/1996 | Gray et al. | ................... | 340/605 |
| 5,850,175 A * | 12/1998 | Yeilding | ..................... | 340/431 |
| 5,987,105 A | 11/1999 | Jenkins et al. | | |
| 5,995,898 A | 11/1999 | Tuttle | | |
| 6,123,166 A * | 9/2000 | Verellen | ..................... | 180/268 |
| 6,650,244 B1 | 11/2003 | Chen et al. | | |
| 7,057,507 B1 | 6/2006 | Sandifer | | |
| 7,100,558 B2 * | 9/2006 | Amanuma et al. | ........ | 123/179.4 |
| 7,119,699 B2 | 10/2006 | King et al. | | |
| 7,142,101 B2 | 11/2006 | Morris | | |
| 7,284,428 B1 * | 10/2007 | Hoben et al. | ................ | 340/612 |
| 2007/0079653 A1 * | 4/2007 | Zuleta et al. | .............. | 73/304 R |
| 2008/0092633 A1 * | 4/2008 | Wagner | .................... | 73/40.7 |
| 2009/0126483 A1 * | 5/2009 | Blendinger et al. | ........ | 73/304 C |
| 2010/0117841 A1 * | 5/2010 | Sanford et al. | .............. | 340/604 |

* cited by examiner

*Primary Examiner*—Daniel Wu
*Assistant Examiner*—Son M Tang
(74) *Attorney, Agent, or Firm*—Patrick J. Daugherty; Driggs, Hogg, Daugherty & Del Zoppo Co., LPA

(57) ABSTRACT

A fluid detection system comprises a liquid sensor, an air pump and an atmospheric pressure sensor encased within an air and water permeable casing defining an enclosed air space. The pressure sensor acquires pressure samples within the casing, the air pump expelling additional gas into the casing. In response to determining a flood-status or a non-flood-status state of the fluid detection system and comparing the samples, a failure of the fluid detection system or an immersion of the fluid detection system in fluid is determined. In some embodiments, failure is determined if a second sample is greater than a first sample in a non-flooded state, and in others immersion is determined if a second sample is greater than a first sample value and the determined state is flooded. In some examples, gas is expelled across a liquid detection surface and a third sample value is acquired.

22 Claims, 4 Drawing Sheets

IMMERSION DETECTION

FIELD OF THE INVENTION

The present invention generally relates to observing and tracking immersion or flooding events with respect to one or more objects, and more particularly with respect to apparatus such as automotive vehicles. Accordingly methods, systems, and program products are provided that may detect, store and/or allow for retrieval of data pertaining to when, where, and/or how long a vehicle or other object has been immersed or submerged in water.

BACKGROUND OF THE INVENTION

A wide variety of vehicles are known, commonly used as a conveyance for the transportation of people or objects. Some illustrative but not exhaustive examples include passenger automobiles, trucks, rail cars, all-terrain vehicles (ATV's), mobile homes and campers. Some vehicles and associated systems are sophisticated, complex and expensive, requiring a substantial commitment of funds for purchase and maintenance, and may command high prices for rental or lease to third parties or resale to subsequent purchasers, and may also retain substantial residual value at the end of a rental or lease term.

Vehicles may be exposed to a wide variety of damaging environmental exposures and extreme operating conditions, which due to actual or potential damage may diminish the value of a vehicle to subsequent purchasers or violate owner/operator lease or rental agreements. For example, a rental car company lease agreement may forbid off-road use of a rented sport utility vehicle (SUV), in order to prevent use in rivers and stream beds otherwise enabled by the capabilities of the vehicle, and which may damage or diminish the value of the SUV. Yet determining the actual environmental exposure or operating condition history of a given vehicle is not generally possible through routine physical inspection of the vehicle: for example, washing a rented SUV before return may conceal an off-road use.

Of particular concern are vehicle submersion events. When a vehicle is partially or totally immersed in water, such as through encounters with floodwaters or entry into rivers, lakes and other bodies of water, the vehicle may experience direct system failures or damage; and also indirect or potential damage only evident much later, such as rust, mildew and molding damage. Problems arise when an operator or other responsible party chooses to conceal knowledge of an immersion event from a current or prospective owner or operator of the vehicle. For example, many passenger cars located in the states of Louisiana and Mississippi in the U.S.A. were submerged in floodwaters caused by Hurricane Katrina in 2005 and salvaged by owners and insurance companies as total losses; some of these salvaged vehicles were sold to subsequent purchasers unaware of their floodwater submersion at normal un-salvaged market pricing, the flooding information intentionally withheld in order to inflate the value of the vehicle and defraud the purchasers. It also known for vehicle owner/operators to falsely claim immersion events in order to receive insurance proceeds for the alleged associated damage or even fully liquidate the value of the vehicle, thus exposing insurance companies to losses through fraudulent claims. And submersion of a leased vehicle may dramatically reduce the true market residual value of the vehicle upon expiration of the lease, yet the leasing company or a subsequent purchaser may be defrauded into placing a higher market value on the vehicle by withholding notice of the submersion event.

Prior art methods for determining whether or not a vehicle has been immersed or flooded generally rely upon visual inspection and verification techniques. Such techniques require an adequately trained inspector to physically inspect a vehicle and detect or verify a flooding event, and thus a commensurate expenditure of assets for the requisite training and employment thereof. Even then, discovering or verifying a flooding event may be very difficult even for expert inspectors. Moreover, some events may only be evident after application of invasive techniques that necessitate damage to the vehicle, for example by cutting open or removing seat coverings to inspect underlying materials. Some evidence may fade, diminish or disappear over time, along with the practical ability to detect or verify the flooding event, even as rust, mildew and/or mold damage is slowly progressing toward a later manifestation. And evidence of a submersion event may be intentionally obstructed of removed from the vehicle in order to actively conceal the submersion event.

SUMMARY OF THE INVENTION

Methods, systems and program products are provided for monitoring fluid detection. A fluid detection system comprises a liquid sensor in circuit communication with an air pump and an atmospheric pressure sensor, all encased within an air and water permeable casing defining an enclosed air space. The atmospheric pressure sensor acquires a first sample of atmospheric pressure within the casing, the air pump expels an additional quantity of gas into the casing and the atmospheric pressure sensor acquires a second atmospheric pressure sample. In response to determining a flood-status or a non-flood-status state of the fluid detection system and comparing the first and second pressure samples a failure of the fluid detection system or an immersion of the fluid detection system in fluid is determined.

In some embodiments a failure of the fluid detection system is determined if the second sample value is greater than the first sample value and the determined state status is a non-flood status state. And in some embodiments an immersion of the fluid detection system in fluid is determined if the second sample value is greater than the first sample value and the determined state status is a flood-status state.

In some examples an immersion of the fluid detection system in fluid is determined by acquiring the first sample value prior to determining the flood-status or the non-flood-status state; acquiring the second sample value in response to the determining a flood-status state; if the second sample value is greater than the first sample value, the air pump expels gas across a liquid detection surface of the liquid sensor; the atmospheric pressure sensor acquires a third sample value of atmospheric pressure within the casing subsequent to the air pump expelling the additional quantity of gas; and the immersion is determined if the third sample value greater than or equal to the second sample value.

In some embodiments the fluid detection system comprises a timer in circuit communication with the processing means and configured to generate periodic timer outputs and a memory in circuit communication with the processing means, and wherein initiating determining of a flood-status state, acquiring sample values, expelling gas, comparing pressure samples, determining failure of the fluid detection system or immersion of the fluid detection system is in response to a timer periodic timer output. Event data is also generated by associating temporal data with sample values and flood-flood status states, and read from and written to the memory.

In another aspect a method for deploying an application for monitoring a fluid detection system provided, comprising providing a computer infrastructure being operable to practice the steps of the invention described above, as well as others. For example a computer infrastructure is operable to determine a flood-status or a non-flood-status state of a fluid detection system comprising a liquid sensor in circuit communication with an air pump and an atmospheric pressure sensor encased within an air and water permeable casing defining an enclosed air space; cause the atmospheric pressure sensor to acquire a first sample value of atmospheric pressure within the casing; cause the air pump to expel an additional quantity of gas into the casing; cause the atmospheric pressure sensor to acquire a second sample value of atmospheric pressure within the casing; compare the first and second pressure samples; and in response to a difference between the first sample value and the second sample value and to determining the flood-status or non-flood-status state of the fluid detection system, determine a failure of the fluid detection system or an immersion of the fluid detection system in fluid.

In some examples the computer infrastructure is further operable to determine failure of the fluid detection system if the second sample value is greater than the first sample value and the determined state status is a non-flood status state. And in another aspect the computer infrastructure is further operable to determine immersion of the fluid detection system in fluid if the second sample value is greater than the first sample value and the determined state status is a flood-status state.

In one aspect the computer infrastructure is operable to determine the immersion of the fluid detection system in fluid by causing the atmospheric pressure sensor to acquire the first sample value prior to determining the flood-status or the non-flood-status state; causing the atmospheric pressure sensor to acquire the second sample value in response to the determining of the flood-status state of the fluid detection system, wherein the state is a flood-status state; in response to determining that the second sample value is greater than the first sample value, causing the air pump to expel the additional quantity of gas across a liquid detection surface of the liquid sensor; causing the atmospheric pressure sensor to acquire a third sample value of atmospheric pressure within the casing subsequent to the air pump expelling the additional quantity of gas; and determining the immersion of the fluid detection system in fluid if the third sample value greater than or equal to the second sample value.

In another aspect the fluid detection system comprises a timer configured to generate periodic timer outputs and a memory, the computer infrastructure further operable to initiate determining the flood-status state, cause the atmospheric pressure sensor to acquire sample values, cause the air pump to expel gas, compare pressure samples, determine a failure of the fluid detection system or an immersion of the fluid detection system in fluid in response to a timer periodic timer output, generate event data by associating temporal data with sample values flood status states, and read from and write event data to the memory.

In another aspect a flood detection system comprises a processing means comprising a logic controller; a liquid sensor in circuit communication with the processing means; an air pump in circuit communication with the processing means; an atmospheric pressure sensor in circuit communication with the processing means; a power supply means connected to the processing means, the liquid sensor, the air pump and the atmospheric pressure sensor; and an air permeable and water permeable casing disposed about and encompassing the liquid sensor, the air pump and the atmospheric pressure sensor and defining an enclosed air space. The processing means is configured to determine a flood-status state of the fluid detection system; cause the atmospheric pressure sensor to acquire a sample values of atmospheric pressure within the casing; cause the air pump to expel gas into the casing; compare pressure samples; and in response to a difference between the sample values and to a flood-status state, determine a failure of the fluid detection system or an immersion of the fluid detection system in fluid.

In one aspect a system processing means is configured to determine a failure of the fluid detection system if a second sample value is greater than a first sample value and a determined state status is a non-flood status state. And in another aspect a system processing means is configured to determine an immersion of the fluid detection system in fluid if a second sample value is greater than a first sample value and a determined state status is a flood-status state.

In one aspect a system processing means is configured to determine an immersion of the fluid detection system in fluid by causing the atmospheric pressure sensor to acquire a first sample value prior to determining a flood-status state and a second sample value in response to a flood-status state; if a second sample value is greater than a first sample value, causing the air pump to expel an additional quantity of gas across a liquid detection surface of the liquid sensor; causing the atmospheric pressure sensor to acquire a third sample value of atmospheric pressure within the casing subsequent to the air pump expelling the additional quantity of gas; and determining an immersion of the fluid detection system in fluid if the third sample value is greater than or equal to the second sample value.

In another aspect a system comprises a timer in circuit communication with the processing means and configured to generate periodic timer outputs, and a memory in circuit communication with the processing means. The processing means is configured to determine a flood-status state, cause the atmospheric pressure sensor to acquire sample values, cause the air pump to expel gas, compare the pressure samples, and determine a failure of the fluid detection system or an immersion of the fluid detection system in fluid in response to a periodic timer output. The processing means is also configured to associate temporal data with the sample values and the flood-state and non-flood state status states to generate event data, and read event data from and write the event data to the memory.

BRIEF DESCRIPTION OF THE DRAWINGS

These and other features of this invention will be more readily understood from the following detailed description of the various aspects of the invention taken in conjunction with the accompanying drawings in which.

Figure 1:
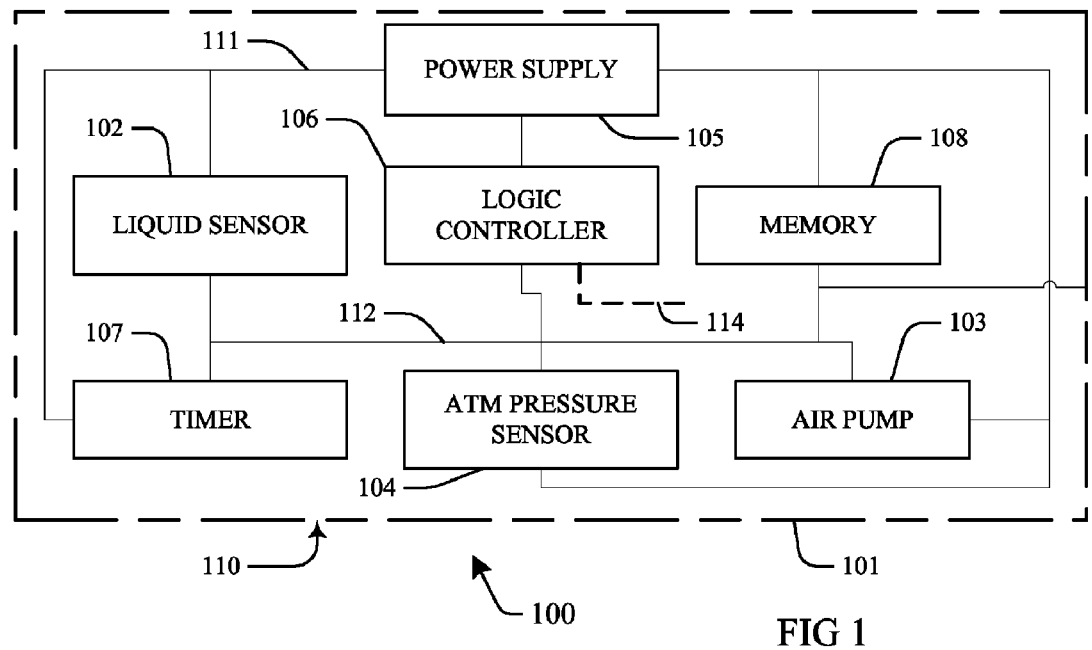
FIG. 1 is a block diagram illustrating an apparatus and system for supervised monitoring of immersion detection.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
I. General Description
II. Computerized Implementation I. General Description The present invention provides system, method, and program products for the supervised monitoring of immersion detection devices. Embodiments of the invention provide for the detection of flooding events, in some examples also providing for storage and retrieval of data pertaining to detected events, including information pertaining to when, where, and how long a vehicle has been partially or totally flooded or submerged in water. The inventions further incorporate components and methods to prevent tampering with flood detection components in order to prevent interference with operation of the invention and thereby fraudulent concealment of a flooding event.

FIG. 1 illustrates an immersion sensing detector 100 configured for installation and operation within a vehicle or non-vehicle application. Exemplary vehicles include passenger cars, utility and pick-up vehicles, trucks, all-terrain vehicles (ATV's), motorcycles, boats, and luggage and golf carts; other vehicles appropriate for use with the present invention will also be apparent. The detector 100 may also be incorporated into non-vehicle applications, such as for example in agricultural and mining machinery including conveyers, sorters and packagers, and other non-vehicle flood-detection applications will also be apparent to one skilled in the art. Thus the present application examples are merely illustrative and not exhaustive The detector 100 comprises a liquid sensor 102, an air pump 103, an atmospheric (ATM) pressure sensor 104, a power supply 105, a timer 107, a memory element 108 and a tamper-resistance casing 101 all in a circuit communication 112 with a logic controller 106, each of the other elements surrounded and encased by the casing 101. The power supply 105 provides independent power to each component through a power circuit 111, and the logic controller 105 is configured to communicate with other components and entities through an external communication link 114.

Exemplary but not exhaustive examples of the liquid sensor 102 include point sensors, single point cable-based sensors, and full path cable-based sensors. Point sensors are generally single small sensors that can detect liquid via a small exposed surface. Single point cable-based sensors are generally flexible cables containing a plurality of single point sensors located at one or points along the cable, each point sensor configured to individually or in combination report the detection of contact with a liquid. And full path cable-based sensors are cables that can detect liquid along portions of or the full path of the cable. In some embodiments advantages are provided by configuring the liquid sensor 102 to repeatedly sense and report multiple unique liquid-sensing events without loss of accuracy, though in other examples the liquid sensor 102 may be a single event/single use sensor 102.

The detector 100 system and apparatus is configured for supervised monitoring and detection of immersion events. Supervised systems and methods are generally understood as providing for self-monitoring for system failures and automatic notification of system failures, and thus the supervised system and method incorporates components and/or processes that provide for a built-in monitoring and self-checking for functionality without requiring an external supervisory entity to engage and monitor the system. Exemplary supervised systems include fire alarm systems, which generally provide immediate notification through initiating an alarm condition when a system component failure is detected through an internal monitoring component and process, thus broadcasting or notifying notice of the failure to another entity. In one advantage of the present invention the detector 100 may be configured to self-detect and report efforts to defeat flood detection through tampering with the detector 100 through supervised components and processes. In one example tampering with the detector 100 by cutting or interrupting the circuit connection 112 between the controller 106 and any of the other internal elements 102, 103, 104, 105, 107 and 108 or the external casing 101 may be detected and interpreted by the controller 106 and reported as a failure or tampering event. Thus in some embodiments the casing 101 seals the detector 100 into a fixed structure installation, wherein interference with the detector 100 through opening of the casing 101 or disconnection of the casing 101 from its attachment to a vehicle or apparatus structure and/or removal or replacement of any of the internal elements 102, 103, 104, 105, 107 and 108 interrupts or impacts the circuit connection 112 and is responsively detected and reported as a tampering or failure event.

One may also attempt to tamper with the detector 100 by isolating it from contact with water or liquids indicative of a flooding event. More particularly, the casing 101 is configured to be water and air-permeable, thus to allow air and water to move into and out of the casing 101 generally, and more particularly in the event of submersion of the casing into water or other fluids. The present embodiment thus incorporates a plurality of apertures 110 configured to admit water or other fluids into or out of the casing 101 in a flooding event and into contact with the liquid sensor 102. However, it is to be understood that the casing may have alternate water and air-permeable structural characteristics: for example, the casing 101 may be formed from a woven resilient or rigid material, such as a resilient fabric or woven screen structure, and other alternatives may be apparent to one skilled in the art.

Accordingly, one may tamper with the detector 100 by covering the casing 101 with or sealing it within a water-proof or water-impermeable barrier, such as plastic sheeting or water-proof adhesive tape materials like duct-tape, so that if a flooding event does occur no water will be admitted to the sensor 102. By incorporating the air pump 103 and the atmospheric pressure sensor 104 along with the liquid sensor 102 within the casing 101, the detector 100 is configured to detect and report such a tampering event.

It will also be understood that the present embodiment provides for a configuration and method to detect tampering with the detector 100 that will isolate the liquid sensor 102 from contact with water during a submersion event, wherein at least the sensor 102, the pressure sensor 104 and the air pump 103 are located within the casing 101: thus in alternative embodiments one or more of the power supply 105, controller 106, timer 107, and/or memory 108 may be located outside of the casing 101 but still in respective circuit 112 and/or power 111 communications with the encased elements 102, 103 and 104.

Figure 2:
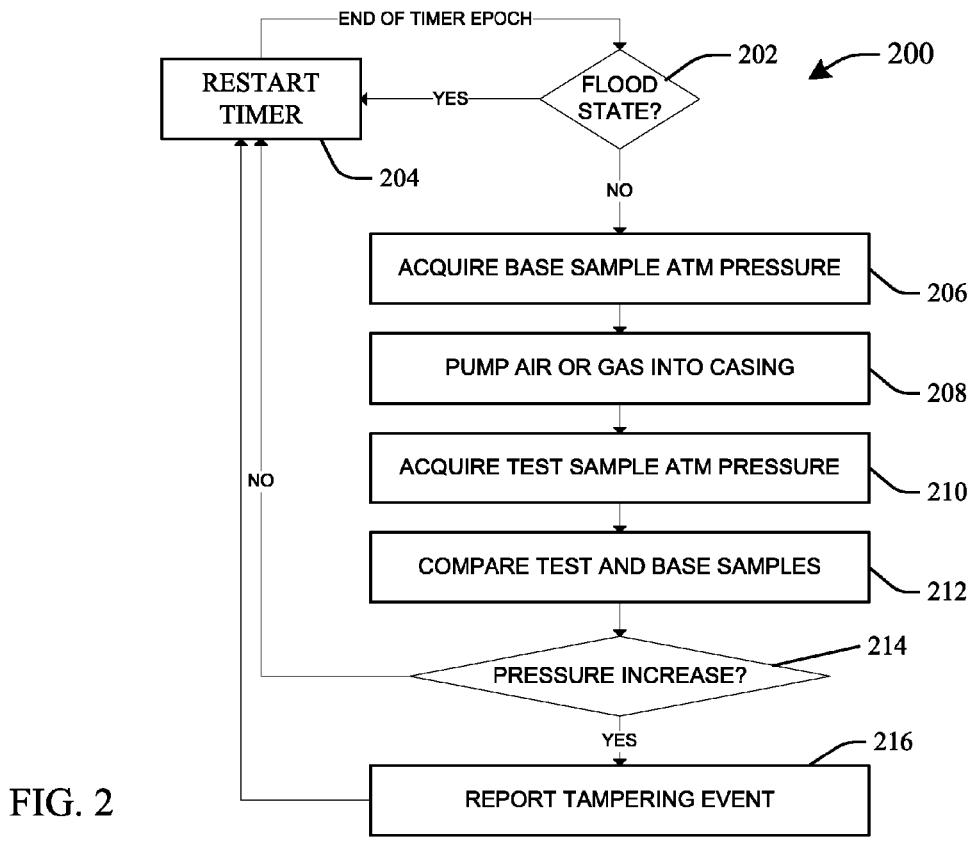
FIG. 2 is a block diagram of a process and method for monitoring an immersion detection device.

FIG. 2 illustrates one method or process by which the detector 100 may detect and report if the casing 101 has been covered with or sealed within a water-proof or water-impermeable barrier. An interrogation process 200 is initiated at 202 in response to one or more inputs to the controller 106: in one example the timer 107 is configured to periodically output an initiation input to the controller 106 to start the interrogation process 200 at the end of a test period epoch at 202, though other initiation inputs may be provided, including an interrogation from another logic system, processor, supervisory system or service provider through the external communication link 114.

The process thus instigated, at 202 the controller determines whether the detector 100 is presently in a flood-status mode, and if so the interrogation process 200 ends at 204, wherein in some examples the test period epoch also restarts. A flood-status state may be indicated by the liquid sensor 102 presently detecting liquid, or by a current status state stored in the memory 108 or other storage area. If the detector 100 is not in flood-status state mode, then at 206 the controller 106 engages the pressure sensor 104 to acquire a base sample of atmospheric pressure within the casing 101. After acquiring the base pressure sample, at 208 the controller 106 engages the air pump 103 to expel a quantity of air or other gas into the casing 101, and then at 210 the controller 106 again engages the pressure sensor 104 to sample the atmospheric pressure and acquire a test pressure sample.

Subsequent to operation of the air pump at 208 the base and test sample pressures should be about equivalent, as the casing apertures 110 are configured to admit the entry and egress of liquids and gases into and out of the casing 101. Thus the gas pumped into the casing at 208 should cause the expelling of a corresponding quantity of air out of the casing 101 through the apertures 110, keeping the interior atmospheric pressure of the casing 101 constant as determined by comparing the base and test samples. But if migration of water into the casing 101 has been intentionally impeded through application of a water-resistance barrier, that same barrier will also generally impede the movement of gas into or out of the casing 101, and thus atmospheric pressure inside the casing 101 will rise in proportion to the amount of gas kept within the casing 101 by said tampering water and air-tight barrier or enclosure.

Thus the air pump 103 is configured to expel additional air or other gaseous elements into the casing 101 that causes a net increase in air or gas quantity if the casing 101 is air-tight or outward air and gas migration is otherwise impeded from a surrounding air-tight barrier, and thus causes a corresponding increase in atmospheric pressure within the casing 101 where reactionary outward migration of air or gas through the apertures 110 is impeded. Thus the air pump 103 does not merely move ambient air or gas already present within the casing 101, but adds additional air or gas to the area enclosed by the casing 101. Techniques for admitting the additional air or gas into the casing 101 by operation of the air pump 103 will be readily apparent to one skilled in the art, and some examples include an air pump 103 configured to draw air into the casing 101 through a valved inlet (not shown) from exterior areas, and air pumps 103 that expel a compressed gas from containers (not shown) within or in communication with the air pump 103, such as for example one or more conventional carbon dioxide ($CO_2$) cartridges.

Thus at 212 the controller 106 compares the base and test samples and if the test sample pressure is measurably greater than the base sample pressure at 214, for example having a difference greater than or equal to a pressure increase threshold determined by the amount of gas or air expelled by the air pump 103, then the controller reports a threshold atmospheric pressure increase event at 216; else, no tampering event is detected by the present process 200. The process ends at 204 with the next test period epoch reset and commenced. Results reporting at 216 may include logging the testing event to the memory 108 with event identification data including date and time, and/or communicating the event and/or associated event data to another system or entity through the external communication link 114.

In some embodiments if a tamper event is initially determined in a first iteration of steps 202-214, the steps are repeated one or more times in order to verify the occurrence of a tampering event, wherein reporting of a tampering event at 216 is conditional upon noting another pressure increase at 214 at the end of the requisite number of repetitions. Moreover, in some examples additional confirming iterations are initiated in response to a subsequent timer 107 input after an end of a verification period epoch, in one example of several minutes afterward. In another example the controller 106 is configured to suspend engaging the air pump 103 if the base pressure sample acquired at 206 nears or exceeds an upper threshold tolerance pressure value for the casing 101 or any of the other detector 100 components.

Figure 3:
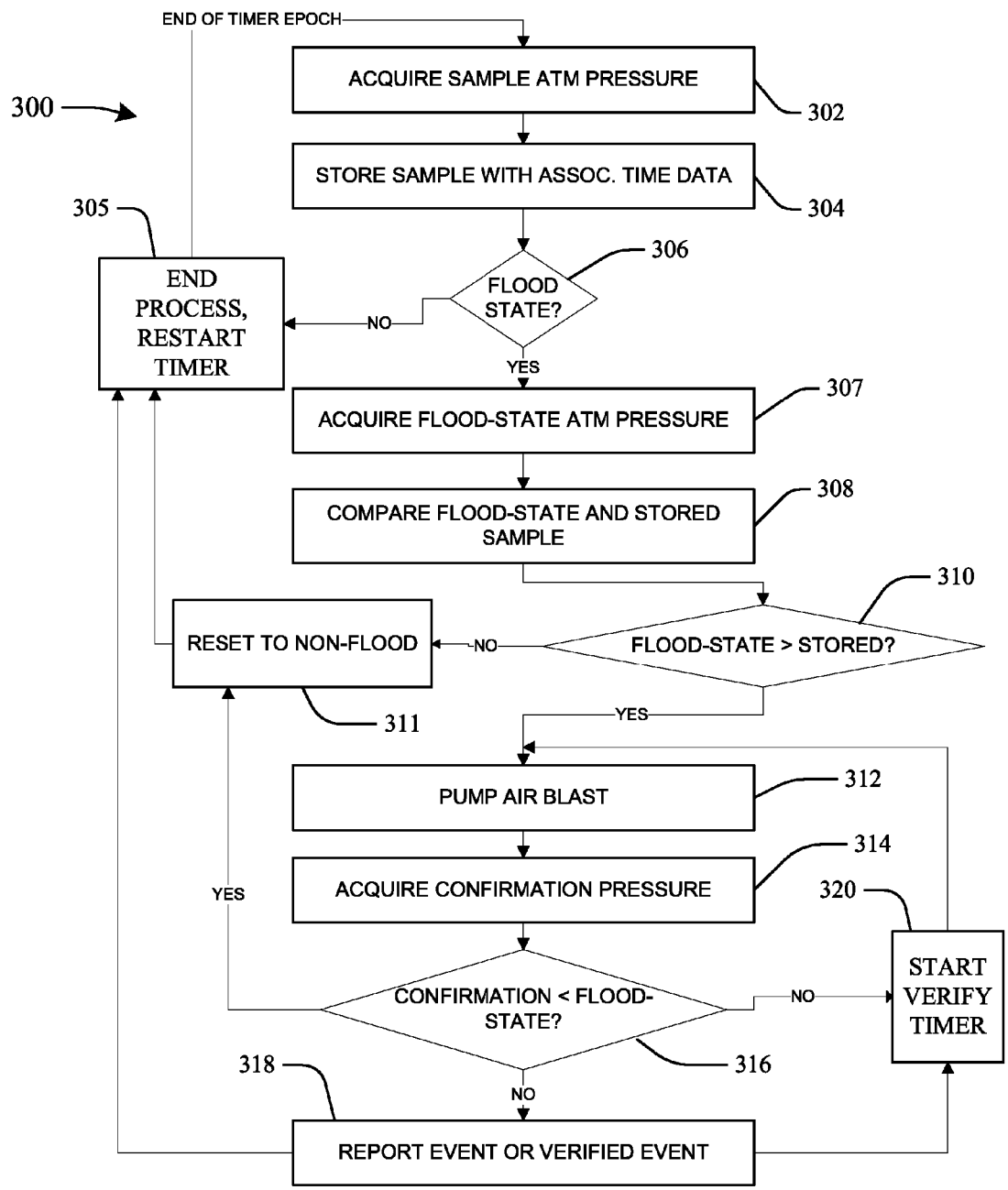
FIG. 3 is a block diagram of a process and method for monitoring an immersion detection device.

FIG. 3 illustrates a flood status process or method 300 wherein the air pump 103 and atmospheric pressure sensor 104 are used to distinguish a flood event detection over a non-flooding event when water has entered the casing 101 or otherwise been detected by the sensor 102. At 302 the controller 106 engages the atmospheric pressure sensor 104 in response to a timer 107 or other input to sample the atmospheric pressure in the casing 101 and store the pressure sample and associated time and date data in the memory 108 at 304. At 306 these process steps 302 and 304 are repeated periodically in response to timer instigation at 305, resulting in at least one most recent sample data stored in the memory 107, until a possible flood event is indicated (for example by an output from the liquid sensor 102), wherein a flood-state pressure sample is acquired from the pressure sensor 104 at 307.

If the detector 100 is submerged the later flood-state sample should have a higher value than the stored sample, since submersing water or fluids have a higher atmospheric pressure than air or ambient gases encompassing a non-submerged pressure sensor. Accordingly, at 308 the flood-state sample acquired at 307 is compared to a sample acquired at 302 and stored in the memory 108 at 304, and at 310 if the flood-state sample pressure is not greater than the stored sample, the ATM pressure sensor 104 is probably not submerged and a "false positive" flood event is indicated, and the flood-state status is reset to non-flood at 311 and detection process resets at 307, optionally recording data associated with the "false positive" event into the memory 107 or reporting in out of the system through the external communication link 114. Otherwise, if the flood-state sample is measurably greater than the stored sample, for example exceeding it by at least a predetermined threshold value, then a flood event is indicated at 310, and in some embodiments the event and associated data (for example including sample times and dates) is recorded in the memory 108 and/or reported by the controller through the external link 114.

In some embodiments, including the example illustrated in FIG. 3, a flood event indicated at 310 is verified by additional processes. For example, the ATM pressure sensor 102 may become temporarily covered with water (such as through a puddle splash or rain water exposure to a vehicle or the detector 100) when the flood-state sample pressure is acquired at 307, resulting in a higher flood-state pressure reading relative to the stored sample as determined at 310 even though a submersion event has not occurred. Thus the present process 300 is configured to avoid a false positive report of a flooding event by at 312 the controller 106 engaging the air pump 103 to pump a blast of air or gas upon the atmospheric pressure sensor 104, and then engaging the ATM pressure sensor 104 to take a confirmation sample at 314. If the pressure sensor 104 was not submerged but only momentarily covered with water when the flood-state sample was acquired at 307, than the blast of air or gas from the air pump 103 at 312 may eject or otherwise remove the water or liquid from the ATM sensor 102 and/or from the casing 101, and thus the confirmation sample acquired at 314 will be measurably lesser than the flood-state sample acquired at 307. Thus at 316, if the 314 confirmation sample is measurably lesser than the 307 flood-state sample, then the flood-state status is reset to non-flood at 311 and detection process resets at 307, optionally recording data associated with the "false positive" event into the memory 107 or reporting in out of the system through the external communication link 114. But if instead at 316 the 314 confirmation sample is not measurably lesser than the 307 flood-state sample, then a flooding event occurrence is determined and reported at 318.

In the present embodiment the pumping 312, sampling 314 and comparing 316 process steps may be repeated periodically through use of a verification time epoch by the timer 107 at 320 until the results observed at the first iteration of 316 are confirmed by at least one subsequent iteration, the process then ending at 318 with a final event report generated to the memory 107 or other entity through the external link 114, and restarting of an appropriate time period at 305. In this fashion a flooding event may be confirmed, negated and/or event duration determined through processing of result data at 318 after each iteration instigated at 320.

Some or all of the components of the detector 100 and/or the central processor component/monitoring entity 420 could be deployed, managed, serviced, etc. by a service provider who offers to implement, deploy, and/or perform the functions of the present invention for others. Thus the memory storage element 108 may be provided, secured and/or maintained by a service provider, in some examples locating the memory 108 physically remote from one or more other of the elements 101-107. In some examples a service provider may interrogate the memory 108 to collect data information. Exemplary but not exhaustive examples of service providers include car dealerships, government agencies, and insurance companies.

In some embodiments the power supply 105 comprises a rechargeable, long-lasting internal battery that is kept charged by a circuit communication (not shown) with an external power source, such as an automobile battery: this enables the detector 100 to remain powered for operation even if external power is cut off. In some examples a loss of external power is logged by the controller 106 to the memory 108, wherein subsequent review of the logged memory 108 data may identify a power loss event as a tampering event. As some power loss may occur through non-tampering events (for example, a failure of an automobile battery), other data including other flood event data stored in the memory 108 or reported by the controller 106 may be used to corroborate a power loss as a tampering event: thus data indicative that a vehicle battery is operational when power is not flowing to the detector 100 may indicate that power to be power supply 105 has been intentionally interrupted.

Figure 4:
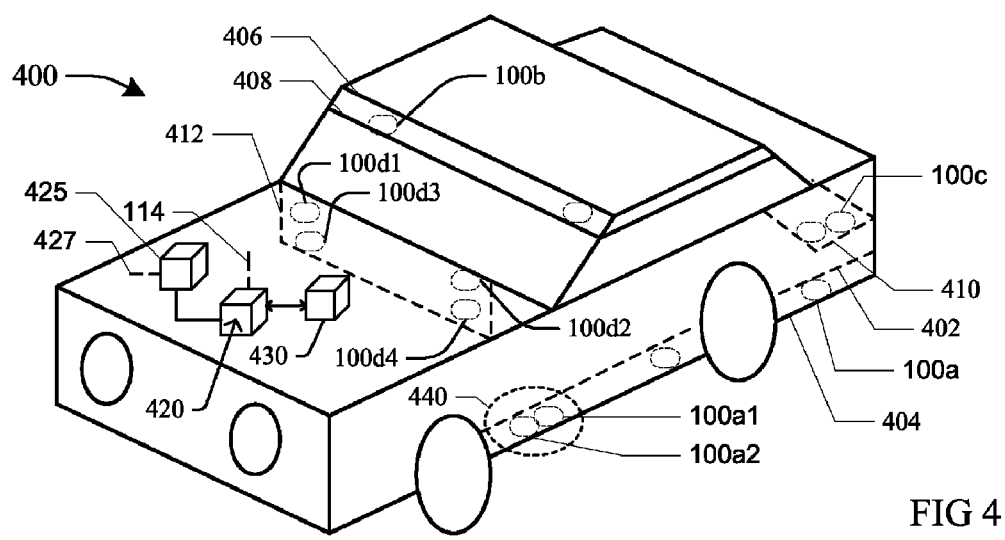
FIG. 4 is a perspective view diagram of a vehicle incorporating an apparatus and system for monitoring immersion detection devices.

In some embodiments the detector 100 is of a generally small size that can be attached (welded, screwed, embedded in, etc.) anywhere in a vehicle or apparatus that water will not ordinarily enter under normal conditions unless a flooding event occurs. FIG. 4 illustrates some exemplary applications of the detector 100 in an automobile 400. One or more frame detectors 100a are embedded within the vehicle steel frame, between interior and exterior structural walls 402 and 404, respectively. Roof area sensor detectors 100b are located in the vehicle roof between the interior roof covering 408 and the exterior roof top 406. Rear area detectors 100c are located in the rear of the car 400 beneath the interior trunk finish material 410. And dashboard area detectors 100d are located behind the interior dashboard finish 412.

In one aspect the sensor detectors 100a-100d are deployed in pluralities in each respective monitored frame, rear, dashboard and roof location area, thereby providing redundancy for each location in order to avoid a false positive flood event report, or a disablement of flood detection in that area due, to failure of one detector 100. And deploying multiple detectors 100 in divergent locations improves accuracy in flood event reporting and enables a determination of an extent of floodwater exposure: for example, an event may submerge lower frame and trunk detectors 100a and 100c, but not the roof and dashboard detectors 100b and 100d.

For embodiments of the detector 100 incorporating the memory 108 within the casing 101 or otherwise on the automobile 400 or other monitored equipment it is preferred that the memory 108 comprise nonvolatile storage media and tamper-proof and, weather-resistant components, and moreover that the memory 108 be able to withstand a wide range of temperatures.

The plurality of sensor detectors 100 are shown in communication with a central processor component or monitoring entity 420, which is in communication with a vehicle computer 425. In one example the vehicle computer 425 is second-generation on-board diagnostic interface (OBD-II) computer configured to provide a gateway through an OBD-II interface 427 that enables the retrieval of vehicle diagnostic and error information, for example by vehicle service technicians and other service provider and monitoring entities connecting to the OBD-II interface. And it will be understood that in some embodiments the vehicle computer 425 may function directly as the central processor component/monitoring entity 420.

The central processor component or monitoring entity 420 is configured to retrieve flood or detector failure event data from detector memories 108 or controllers 106 and communicate the data through a variety of methods, including through the OBD-II interface 427. Other wired and wireless communication methods may also be practiced by the central processor component/monitoring entity 420 in retrieving information through the link 114 and/or outputting data to other systems and entities. Examples of wireless configurations include controllers 106, links 114 and/or central processor components/monitoring entities 420 configured for communication with Bluetooth™ wireless fidelity (WiFi), WIMAX, Near Field Communications (NFC), Zigbee, RuBee, 802.11 wireless local area network (WLAN), short message service (SMS) and/or radio frequency identification (RFID) reader components, and other alternative components, technology, proprietary protocols and physical connections appropriate to practice the present invention(s) will be apparent to one skilled in the art.

The central processor component or monitoring entity 420 may also utilize or communicate with a Global Positioning System (GPS) component 430, and thereby associate and include GPS location data into event data. Thus GPS location information may be used to verify an alleged flood event, wherein a claimed submersion event may be correlated with GPS and event data stored in a detector memory 108 or other memory storage device, enabling an insurance company to validate or deny a claim through verifying that a claimed flooding event actually occurred in an area indicated by GPS, and optionally time and date data, as experiencing flooding conditions or located within the boundaries of a defined body of water.

Figure 5:
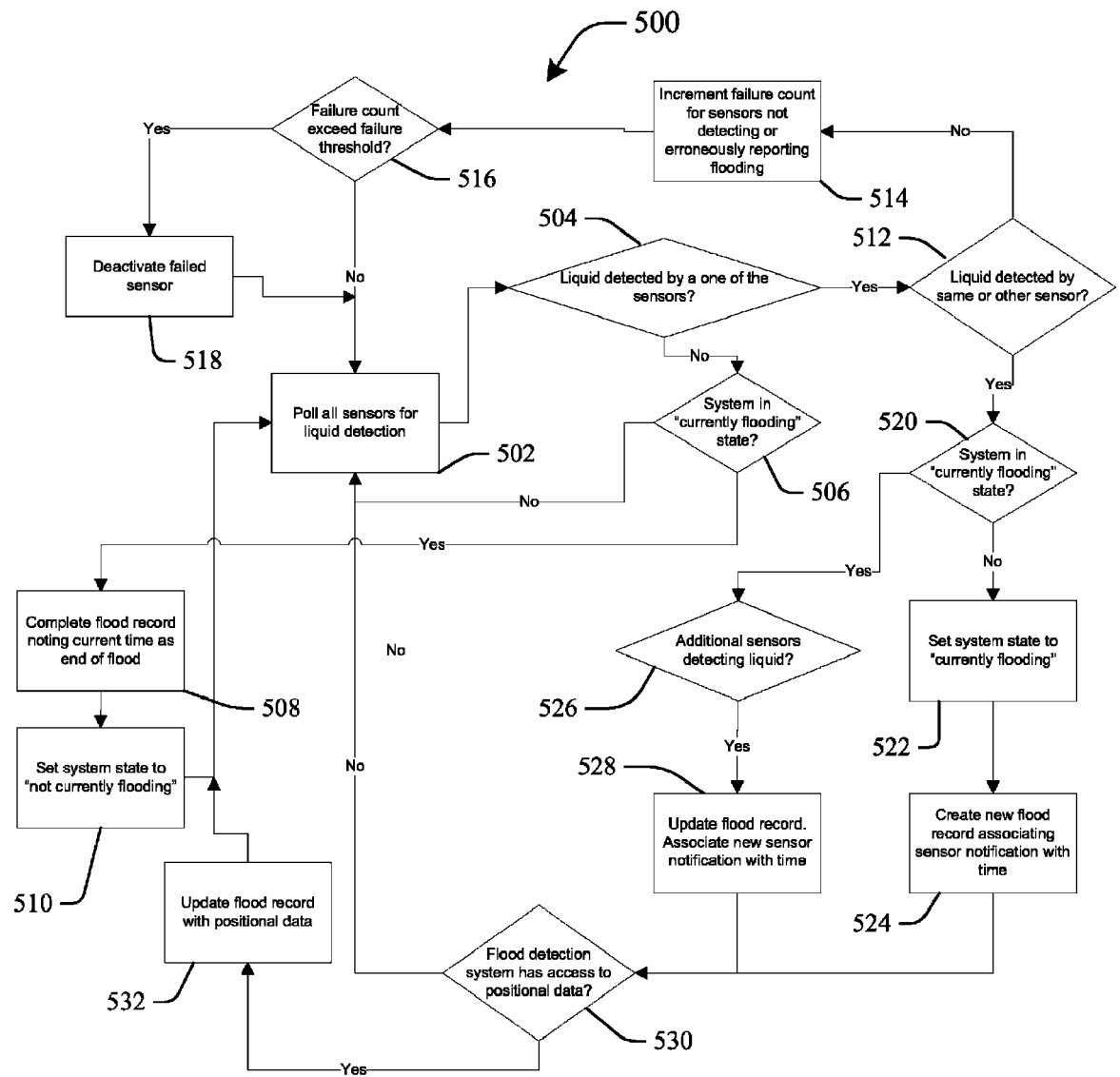
FIG. 5 is block diagram view of a process and method for monitoring a plurality of immersion detection devices.

Event data may be communicated by the detector controller 106 or retrieved from the memory 108 in response to externally-initiated queries by the central processor component/monitoring entity 420 or other entity, or it may "pushed" out thorough the external link 114 upon determination by the controller 106 in response to a detected event or state change. FIG. 5 illustrates one system and/or process 500 for a central processor component/monitoring entity 420 to monitor a plurality of the detectors 100 installed in the vehicle 400 or other apparatus for which flood detection monitoring is desired. The process/system 500 commences at 502 with the central processor component/monitoring entity 420 polling all detectors 100 through a supervisor network communication link 114. Polling at 502 may occur in response to a variety of initiative prompts, including for example a timer input prompt at the end of a test interval epoch by a detector timer 107 or other timer logic or circuit component (not shown) utilized by the central processor component/monitoring entity 420. At 504 the central processor component/monitoring entity 420 polls the detector logic controllers 106 to determine whether any one of the associated liquid sensors 102 is currently detecting a submersing liquid presence.

If no polled detector 100 reports a current submersing liquid detection, then no flooding event is presently occurring. The current flood-state status of the process or system 500 is then ascertained at 506. If the current state is a non-flood state, then the process/system 500 returns to the start point at 502 to await initiation of another polling iteration in response to one or more system prompts. However, if the current state ascertained at 506 is a flood state, then a previously determined flood state has ended and event time and date data associated with the negative poll results obtained at 504 is logged or otherwise used to determine the end of the previously determined flood event at 508, the current flood state is reset to a non-flood status at 510, and the process returns to the start point at 502 to await initiation of another polling iteration.

If however at least one polled detector 100 reports a current submersing liquid detection at 504, then flood detection is verified at 512 by re-polling the detector and/or ascertaining whether any other detector 100 is currently sensing a submersing liquid. More particularly, in some examples a plurality of the flood detectors 100 is deployed to provide redundancy and confirmation of flooding event occurrence determination. For example, referring to FIG. 3 a pair of frame detectors 100a1 and 100a2 are deployed adjacent to each other wherein flooding of an inner frame region 440 would result in submersion of both detectors 100a1 and 100a2, and thus if either one fails to report submersion when the other does, one of the two detectors 100a1 and 100a2 may be in failure mode.

The central processor component/monitoring entity may also be configured to determine at 512 which at least one other detector 100 should also be reporting liquid detection relative to another detector 100 reporting submersion. Thus referring to FIG. 3, if two upper dashboard flood detectors 100d1 and 100d2 and a lower dashboard detector 100d3 are reporting submersion, then the other lower dashboard detector 100d4 should also be reporting submersion, since flood waters should be encompassing said detector 100d4 as well: thus failure of lower detector 100d4 to report submersion indicates that the detector 100d4 has failed.

In response to a failure determination of a detector at 512 a failure count for an identified failing detector 100 is incremented at 514. The incremented failure count is compared to a failure count threshold at 516, and if not greater than the threshold the detector is left activated for subsequent polling iterations at 502. But if the incremented failure count is greater than the threshold, then the failing detector 100 is deactivated at 518 prior to subsequent polling iterations at 502.

If detection of a flooding event at 504 is confirmed by re-polling a reporting detector 100 and/or another at least one detector 100 currently reporting submersion at 512, then the current flood state is ascertained at 520. If the current state is not flood-state, then the current state is set to flood-state at 522 and a new flood event is created at 524, including recording time and date data associated with the flood event detection data.

But if the current state ascertained at 520 is already set to flood state, then the current flood event has already been determined through a previous iteration of the process as commenced at 502, and at 526 it is ascertained whether any detector 100 currently reporting flooding at 512 is "new": that is, it had not reported flooding during this event in a previous iteration of the process commencing at 502. If at 526 any detector 100 currently reporting flooding is new, then the current flood event record data is updated at 528 by adding data from each new reporting detector 100. If instead no detector 100 currently reporting flooding is new, then the process continues to its next iteration commencing at 502.

The present embodiment is also configured to determine geographic positional data for a flood event. Thus if positional data for a vehicle or apparatus incorporating a flood detector 100 is available at 530, for example through communication with a GPS transponder, then at 532 the flood event record data is updated with the positional data.

II. Computerized Implementation

Figure 6:
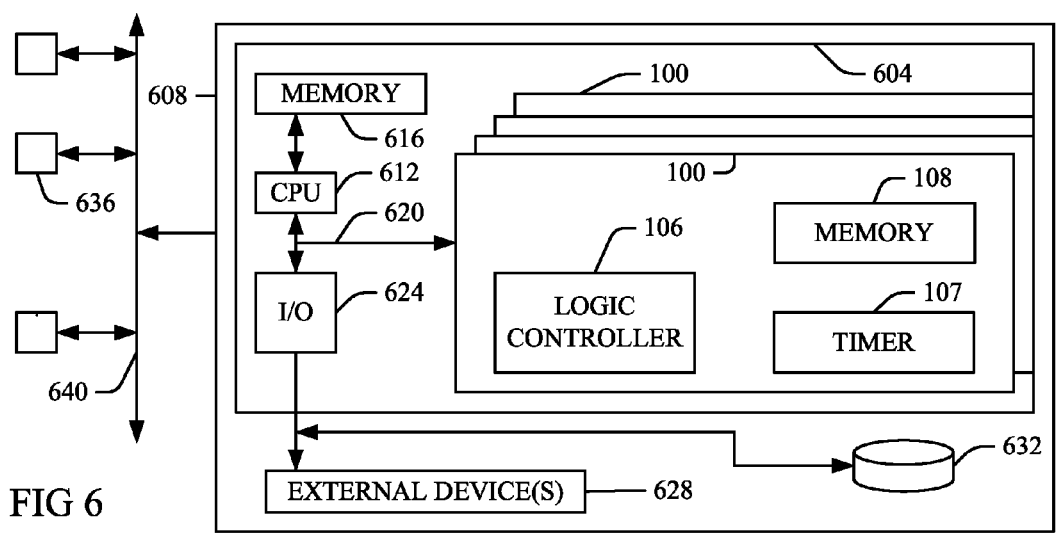
FIG. 6 is a block diagram illustrating an exemplary computerized implementation of a system and method for monitoring immersion detection devices.

Referring now to FIG. 6, an exemplary computerized implementation includes a computer system 604, for example the central processor/monitoring entity 420 illustrated in FIG. 4, deployed within a computer infrastructure 608 and configured to detect and report flooding events according to the present invention. This is intended to demonstrate, among other things, that the present invention could be implemented within a network environment 640 (e.g., the Internet, a wide area network (WAN), a local area network (LAN) 640, a virtual private network (VPN), etc.) 640, and thus in communication with one or more other computers or computer systems 636; or on a stand-alone computer system 608.

Communication throughout the network 640 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 608 is intended to demonstrate that some or all of the components of implementation could be deployed, managed, serviced, etc. by a service provider who offers to implement, deploy, and/or perform the functions of the present invention for others.

As shown, the computer system 604 includes a central processing unit (CPU) 612, a computer system memory 616, input/output (I/O) interfaces 624 and a bus 620 in communication with each of a plurality of flood detector 100 logic controllers 106. In general, the processing unit 612 and detector controller 106 execute computer program code to implement various logic components of the flood sensing detector 100, including the controller 106 and timer 107 components discussed above, the computer program code stored in the detector memory 108, computer system memory 616 and/or storage system 632, though it is to be appreciated that the controller 106 and timer 107 components may be implemented as a single component. Further, the computer system 604 is shown in communication with external I/O devices/resources 628 (for example including the GPS component 430) and a storage system 632. Thus the computer system 604 and detector 100 are configured to perform the tampering method and process 200 illustrated in FIG. 2, the liquid sensor immersion sensing and verification method and process 300 illustrated in FIG. 3, and/or the vehicle flood sensing and reporting method and process 500 illustrated in FIG. 5, and as discussed above.

While executing computer program code, the processing unit 612 and logic controller 106 can read and/or write data to/from the system memory 616, the storage system 632, and/or the I/O interfaces 624. The bus 620 provides a communication link between each of the components in computer system 604. The external devices 628 can comprise any devices (e.g., keyboard, pointing device, display, etc.) that enable a user to interact with computer system 604 and/or any devices (e.g., network card, modem, etc.) that enable computer system 604 to communicate with one or more other computing devices.

The computer infrastructure 608 is only illustrative of various types of computer infrastructures for implementing the invention. For example, in one embodiment, computer infrastructure 608 comprises two or more computing devices (e.g., a server cluster) that communicate over a network to perform the various process steps of the invention. Moreover, computer system 604 is only representative of various possible computer systems that can include numerous combinations of hardware.

To this extent, in other embodiments, the computer system 604 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 612 may comprise a single processing unit, or be distributed across one or more processing units in one or more locations, e.g., on a client and server. Similarly, the detector memory 108, system memory 616 and/or the storage system 632 can comprise any combination of various types of data storage and/or transmission media that reside at one or more physical locations.

Further, I/O interfaces 624 can comprise any system for exchanging information with one or more of the external device 628. Still further, it is understood that one or more additional components (e.g., system software, math co-processing unit, etc.) not shown in FIG. 6 can be included in computer system 604. However, if computer system 604 comprises a handheld device or the like, it is understood that one or more of the external devices 628 (e.g., a display) and/or the storage system 632 could be contained within computer system 604, not externally as shown.

The storage system 632 can be any type of system (e.g., a database) capable of providing storage for information under the present invention. To this extent, the storage system 632 could include one or more storage devices, such as a magnetic disk drive or an optical disk drive. In another embodiment, the storage system 632 includes data distributed across, for example, a local area network (LAN), wide area network (WAN) or a storage area network (SAN) 640. In addition, although not shown, additional components, such as cache memory, communication systems, system software, etc., may be incorporated into computer system 604.

While shown and described herein as a method and a system, it is understood that the invention further provides various alternative embodiments. For example, in one embodiment, the invention provides a computer-readable/useable medium that includes computer program code to enable a computer infrastructure to sense immersion events or tampering. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the detector memory 108, the system memory 616 and/or the storage system 632 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to manage vehicle flooding event sensing, reporting, data retrieval and/or system configuration. In this case, the service provider can create, maintain, support, etc., a computer infrastructure, such as the computer infrastructure 608 that performs process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing vehicle flooding event sensing, reporting, and data retrieval. In this case, a computer infrastructure, such as computer infrastructure 608, can be provided and one or more systems for performing process steps of the invention can be obtained (e.g., created, purchased, used, modified, etc.) and deployed to the computer infrastructure. To this extent, the deployment of a system can comprise one or more of: (1) installing program code on a computing device, such as the detector memory 100, the computer system 604, the vehicle central processor/monitoring entity 420 and/or the vehicle computer 425, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation;

and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for monitoring a fluid detection system, comprising:
    providing a fluid detection system comprising a liquid sensor in circuit communication with an air pump and an atmospheric pressure sensor, wherein the liquid sensor, the air pump and the atmospheric pressure sensor are encased within an air and water permeable casing;
    the casing defining an enclosed air space about the liquid sensor, the air pump and the atmospheric pressure sensor;
    determining a flood status state of the fluid detection system as flooded or non-flooded;
    the atmospheric pressure sensor acquiring a first sample value of atmospheric pressure within the casing;
    the air pump expelling an additional quantity of gas into the casing;
    the atmospheric pressure sensor acquiring a second sample value of atmospheric pressure within the casing;
    comparing the first and the second pressure sample values; and
    determining a failure of the fluid detection system or an immersion of the fluid detection system in fluid in response the comparing of the first and the second sample values and to the determined flood status state.

2. The method of claim 1, comprising determining the failure of the fluid detection system if the second sample value is greater than the first sample value and the determined flood status state is non-flooded.

3. The method of claim 2, comprising determining the immersion of the fluid detection system in fluid if the second sample value is greater than the first sample value and the determined flood status state is flooded.

4. The method of claim 3, further comprising determining the immersion of the fluid detection system in fluid by:
    acquiring the first sample value prior to determining the flood status state;
    acquiring the second sample value if the determined flood status state is flooded;
    in response to determining that the second sample value is greater than the first sample value, the air pump expelling the additional quantity of gas across a liquid detection surface of the liquid sensor;
    the atmospheric pressure sensor acquiring a third sample value of atmospheric pressure within the casing subsequent to the air pump expelling the additional quantity of gas; and
    determining the immersion of the fluid detection system in fluid if the third sample value is greater than or equal to the second sample value.

5. The method of claim 1, comprising the atmospheric pressure sensor acquiring the second sample value of atmospheric pressure within the casing subsequent to the air pump expelling the additional quantity of gas.

6. A method for determining an immersion of a fluid detection system, comprising:
    providing a fluid detection system comprising a liquid sensor in circuit communication with an air pump and an atmospheric pressure sensor, wherein the liquid sensor, the air pump and the atmospheric pressure sensor are encased within an air and water permeable casing, the casing defining an enclosed air space about the liquid sensor, the air pump and the atmospheric pressure sensor;
    the atmospheric pressure sensor acquiring a first sample value of atmospheric pressure within the casing;
    determining a flood status state of the fluid detection system as flooded or non-flooded;
    in response to a determined flooded state, the atmospheric pressure sensor acquiring a second sample value of atmospheric pressure within the casing;
    comparing the first and second pressure samples; and
    determining that the fluid detection system is immersed in a fluid if the second sample value is greater than the first sample value.

7. The method of claim 6, further comprising
    in response to determining that the second sample value is greater than the first sample value, the air pump expelling an additional quantity of gas into the casing and across a liquid detection surface of the liquid sensor;
    the atmospheric pressure sensor acquiring a third sample value of atmospheric pressure within the casing subsequent to the air pump expelling the additional quantity of gas; and
    determining the immersion of the fluid detection system in fluid if the third sample value greater than or equal to the second sample value.

8. A service for monitoring a fluid detection system, comprising:
    providing a computer infrastructure being operable to:
    determine a flooded or a non-flooded status state of a fluid detection system in communication with the computer infrastructure, wherein the fluid detection system comprises a liquid sensor in circuit communication with an air pump and an atmospheric pressure sensor, and wherein the liquid sensor, the air pump and the atmospheric pressure sensor are encased within an air and water permeable casing, the casing defining an enclosed air space about the liquid sensor, the air pump and the atmospheric pressure sensor;
    cause the atmospheric pressure sensor to acquire a first sample value of atmospheric pressure within the casing;
    cause the air pump to expel an additional quantity of gas into the casing;
    cause the atmospheric pressure sensor to acquire a second sample value of atmospheric pressure within the casing;
    compare the first and second pressure samples; and
    in response to a difference between the first sample value and the second sample value and to the determined flood status state, determine a failure of the fluid detection system or an immersion of the fluid detection system in fluid.

9. The service of claim 8, the computer infrastructure being further operable to determine the failure of the fluid detection system if the second sample value is greater than the first sample value and the determined flood status state is a non-flooded state.

10. The service of claim 9, the computer infrastructure being further operable to determine the immersion of the fluid detection system in fluid if the second sample value is greater than the first sample value and the determined flood status state is a flooded state.

11. The service of claim 10, the computer infrastructure being further operable to determine the immersion of the fluid detection system in fluid by:
   causing the atmospheric pressure sensor to acquire the first sample value prior to determining the flood status state;
   causing the atmospheric pressure sensor to acquire the second sample value in response to the determined flood status state being the flooded state;
   in response to determining that the second sample value is greater than the first sample value, causing the air pump to expel the additional quantity of gas across a liquid detection surface of the liquid sensor;
   causing the atmospheric pressure sensor to acquire a third sample value of atmospheric pressure within the casing subsequent to the air pump expelling the additional quantity of gas; and
   determining the immersion of the fluid detection system in fluid if the third sample value greater than or equal to the second sample value.

12. The service of claim 11, wherein the fluid detection system further comprises a timer configured to generate periodic timer outputs and a memory, the computer infrastructure being further operable to:
   initiate the determining of the flood status state, cause the atmospheric pressure sensor to acquire the sample values, cause the air pump to expel the gas, compare the pressure samples, and determine of the failure of the fluid detection system and the immersion of the fluid detection system in fluid in response to a timer periodic timer output;
   generate event data by associating temporal data with the sample values and the flood-state and non-flood state status states; and
   read data from and write the event data to the memory.

13. A method for monitoring a fluid detection system, comprising:
   producing computer executable program code;
   storing the code on a non-transitory computer readable medium;
   providing the program code to be deployed and executed on a computer system, the program code causing the computer system to:
   determine a flooded or a non-flooded status state of a fluid detection system in communication with the computer system, wherein the fluid detection system comprises a liquid sensor in circuit communication with an air pump and an atmospheric pressure sensor, and wherein the liquid sensor, the air pump and the atmospheric pressure sensor are encased within an air and water permeable casing, the casing defining an enclosed air space about the liquid sensor, the air pump and the atmospheric pressure sensor;
   cause the atmospheric pressure sensor to acquire a first sample value of atmospheric pressure within the casing;
   cause the air pump to expel an additional quantity of gas into the casing;
   cause the atmospheric pressure sensor to acquire a second sample value of atmospheric pressure within the casing;
   compare the first and second pressure samples; and
   in response to a difference between the first sample value and the second sample value and to the determined flood status state, determine a failure of the fluid detection system or an immersion of the fluid detection system in fluid.

14. The method of claim 13, the program code comprising instructions which, when executed on the computer system, causes the computer system to determine the failure of the fluid detection system if the second sample value is greater than the first sample value and the determined flood status state is a non-flooded state.

15. The method of claim 14, the program code comprising instructions which, when executed on the computer system, causes the computer system to determine the immersion of the fluid detection system in fluid if the second sample value is greater than the first sample value and the determined flood status state is a flooded state.

16. The method of claim 15, the program code comprising instructions which, when executed on the computer system, causes the computer system to determine the immersion of the fluid detection system in fluid by:
   causing the atmospheric pressure sensor to acquire the first sample value prior to determining the flood status state;
   causing the atmospheric pressure sensor to acquire the second sample value in response to the determined flood status state being the flooded state;
   in response to determining that the second sample value is greater than the first sample value, causing the air pump to expel the additional quantity of gas across a liquid detection surface of the liquid sensor;
   causing the atmospheric pressure sensor to acquire a third sample value of atmospheric pressure within the casing subsequent to the air pump expelling the additional quantity of gas; and
   determining the immersion of the fluid detection system in fluid if the third sample value greater than or equal to the second sample value.

17. The method of claim 16, wherein the fluid detection system further comprises a timer configured to generate periodic timer outputs and a memory, the program code comprising instructions which, when executed on the computer system, causes the computer system to:
   initiate the determining of the flood status state, cause the atmospheric pressure sensor to acquire the sample values, cause the air pump to expel the gas, compare the pressure samples, and determine of the failure of the fluid detection system and the immersion of the fluid detection system in fluid in response to a timer periodic timer output;
   generate event data by associating temporal data with the sample values and the flood-state and non-flood state status states; and
   read data from and write the event data to the memory.

18. A flood detection system, comprising:
   a processing means comprising a logic controller;
   a liquid sensor in circuit communication with the processing means;
   an air pump in circuit communication with the processing means;
   an atmospheric pressure sensor in circuit communication with the processing means;
   a power supply means connected to the processing means, the liquid sensor, the air pump and the atmospheric pressure sensor; and
   an air permeable and water permeable casing disposed about and encompassing the liquid sensor, the air pump and the atmospheric pressure sensor and defining an enclosed air space;
   wherein the processing means is configured to:
   determine a flood status state of the fluid detection system as a flooded state or a non-flooded state;

cause the atmospheric pressure sensor to acquire a first sample value of atmospheric pressure within the casing;

cause the air pump to expel an additional quantity of gas into the casing;

cause the atmospheric pressure sensor to acquire a second sample value of atmospheric pressure within the casing;

compare the first and second pressure samples; and in response to a difference between the first sample value and the second sample value and to determining the flood status state, determine a failure of the fluid detection system or an immersion of the fluid detection system in fluid.

19. The system of claim 18, the processing means further configured to determine the failure of the fluid detection system if the second sample value is greater than the first sample value and the determined flood status state is the non-flooded state.

20. The system of claim 19, the processing means further configured to determine the immersion of the fluid detection system in fluid if the second sample value is greater than the first sample value and the determined flood status state is the flooded state.

21. The system of claim 20, the processing means further configured to determine the immersion of the fluid detection system in fluid by:

causing the atmospheric pressure sensor to acquire the first sample value prior to determining the flood status state;

causing the atmospheric pressure sensor to acquire the second sample value in response to the determined flooded state;

in response to determining that the second sample value is greater than the first sample value, causing the air pump to expel the additional quantity of gas across a liquid detection surface of the liquid sensor;

causing the atmospheric pressure sensor to acquire a third sample value of atmospheric pressure within the casing subsequent to the air pump expelling the additional quantity of gas; and determining the immersion of the fluid detection system in fluid if the third sample value greater than or equal to the second sample value.

22. The system of claim 21, further comprising:

a timer in circuit communication with the processing means and configured to generate periodic timer outputs; and a memory in circuit communication with the processing means;

wherein the processing means is configured to determine the flood status state, cause the atmospheric pressure sensor to acquire the sample values, cause the air pump to expel gas, compare the pressure samples, determine the failure and determine the immersion in response to a periodic timer output;

wherein the processing means is configured to associate temporal data with the sample values and the determined flood status state to generate event data; and wherein the processing means is configured to read data from and write the event data to the memory.

* * * * *